US008504543B1

(12) United States Patent
Andreessen et al.

(10) Patent No.: US 8,504,543 B1
(45) Date of Patent: Aug. 6, 2013

(54) AUTOMATIC API GENERATION FOR A WEB APPLICATION

(75) Inventors: Marc L. Andreessen, Palo Alto, CA (US); Diego Doval, Mountain View, CA (US); David Sklar, New York, NY (US); Martin Traverso, Mountain View, CA (US)

(73) Assignee: Glam Media, Inc., Brisbane, CA (US)

( * ) Notice: Subject to any disclaimer, the term of this patent is extended or adjusted under 35 U.S.C. 154(b) by 1642 days.

(21) Appl. No.: 11/684,555

(22) Filed: Mar. 9, 2007

(51) Int. Cl.
*G06F 7/00* (2006.01)

(52) U.S. Cl.
USPC ........... 707/705; 707/706; 707/758; 707/769; 709/201; 709/217; 709/229

(58) Field of Classification Search
USPC ... 707/999.006, 705, 706, 758, 769; 709/201, 709/217, 229
See application file for complete search history.

(56) References Cited

U.S. PATENT DOCUMENTS

| | | |
|---|---|---|
| 2002/0078057 A1 | 6/2002 | Wang et al. |
| 2003/0023445 A1 | 1/2003 | Trifon |
| 2006/0274767 A1 | 12/2006 | Dessau |
| 2007/0106650 A1 * | 5/2007 | Moore ............................ 707/3 |
| 2008/0071883 A1 | 3/2008 | Alterman |
| 2008/0147672 A1 * | 6/2008 | Pena et al. ...................... 707/10 |

OTHER PUBLICATIONS

Aversano, L. et al., "Web Site Reuse: Cloning and Adapting," *Proceedings of the Third International Workshop on Web Site Evolution*, 2001, pp. 107-111.
Di Lucca, G. et al., "An Approach to Identify Duplicated Web Pages," *Proceedings of the Twenty-sixth Annual International Computer Software and Applications Conference*, 2002, pp. 481-486.
Internetsoft Corporation, "Offline Downloader" User's Guide, 2000-2006, nineteen pages. [Online] [Retrieval date Unknown] Retrieved from the Internet <URL:http://www.softwarea.com/offline-browser/index.htm.>
Lanubile, F. et al., "Finding Function Clones in Web Applications," *Proceedings of the Seventh European Conference on Software Maintenance and Reengineering*, 2003, pp. 379-386.

* cited by examiner

*Primary Examiner* — Hosain Alam
*Assistant Examiner* — Jieying Tang
(74) *Attorney, Agent, or Firm* — Dergosits & Noah LLP

(57) ABSTRACT

A system and a method are disclosed for automatically providing an API for a Web-based application. An API processing core receives a call, performs a variety of actions on the call prior to executing it, determines based on the actions whether the call is a valid API call to the currently existing application functionality, and if the call is a valid API call, executes it. The call syntax is constructed primarily out of elements applicable to any Web-based application using the system.

20 Claims, 3 Drawing Sheets

AUTOMATIC API GENERATION FOR A WEB APPLICATION

CROSS REFERENCE TO RELATED APPLICATIONS

The present application contains subject matter that may be related to the subject in one or more of the following commonly owned applications: U.S. patent application Ser. No. 11/134,250, filed on May 19, 2005 and entitled "Hosted Application Server"; U.S. patent application Ser. No. 11/141,983, filed on May 31, 2005 and entitled "Content Access and Navigation"; U.S. patent application Ser. No. 11/195,378, filed on Aug. 2, 2005 and entitled "Shared Data Model"; U.S. patent application Ser. No. 11/195,349, filed on Aug. 2, 2005 and entitled "Interacting with a Shared Data Model"; U.S. patent application Ser. No. 11/213,309, filed on Aug. 26, 2005 and entitled "Content Selection"; and U.S. patent application Ser. No. 11/621,056, filed Jan. 8, 2007 and entitled "Web Application Cloning", each of which are hereby incorporated by reference.

BACKGROUND

The present invention generally relates to the field of computer software, and more specifically, to Web-based applications.

An application programming interface (API) allows programmatic access to the facilities of an application, such as the data that the application manages and the operations provided by the application. Such programmatic access allows interaction with the application, such as retrieving and updating application content, through program code. This access through an API is typically exposed to other applications, which can be either remotely or locally situated with respect to the application itself. In addition, an API can often be accessed by a user through a suitable user interface for the application itself or from a client application, such as a browser. Thus, for example, if a first application exposes its operations through an API, then not only can a user manually interact with the first application through its user interface, but a second application can also interact with it programmatically using its API.

Existing systems, however, require developers to manually design and code the API for the application operations that they choose to expose. This approach has a number of shortcomings. First, it requires the developers to invest initial time and effort to provide the API, an investment that could have been better spent in some more substantive and creative area of development. Second, when the operations of the application change, the manual API generation approach requires subsequent effort to reflect these changes in the API, thus requiring ongoing effort on the part of the developers, or in some cases restricts the functionality changes that can be made in order to ensure compatibility.

From the above, there is a need for a system and method to automatically provide an application with an API.

SUMMARY

A system and method automatically provides to a Web-based application an API enabling client applications to access the application's functionality.

The system comprises an API processing core, which analyzes and executes API calls received from various client applications, and a data store, which stores application data for various Web-based applications. A call for a particular application is received from a client by the API processing core. The API processing core performs various preprocessing and validation actions on the call prior to executing it, such as call syntax validation, identifying the application for which the call is intended, and security checks of the call, the client, and the application. As a result of these actions, some of which involve communicating with the data store, the API processor can determine whether the call is a valid API call according to the operations currently exposed by the application and the application's associated data. If the call is a valid API call, the API processor executes the call against the data store and returns the resulting data, if any, to the client.

The call itself is specified largely according to a "meta-API" syntax that is neutral with respect to any Web-based application supported by the system. More specifically, the syntax includes a component to identify an application to receive the call, and one or more components identifying an operation to be performed on the application. The components are application independent in that they may be applied to any hosted application, and are not specific to operations defined within an application. Application specific components of the call are limited to identification of specific resources (e.g., data) of the application on which the operation is to be performed. The use of the meta-API for the call, and the call verification checks performed by the system for any application-specific portion of the call, make it safe and simple for a client to specify a call to the functionality exposed by a Web-based application, with no need for the developer to manually provide an API.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

The disclosed embodiments have other advantages and features which will be more readily apparent from the following detailed description and the appended claims, when taken in conjunction with the accompanying drawings, in which:

DETAILED DESCRIPTION

The figures and the following description relate to embodiments of the present invention by way of illustration only. It should be noted that from the following discussion, alternative embodiments of the structures and methods disclosed herein will be readily recognized as viable alternatives that may be employed without departing from the principles of the claimed invention.

Architectural Overview

Figure 1:
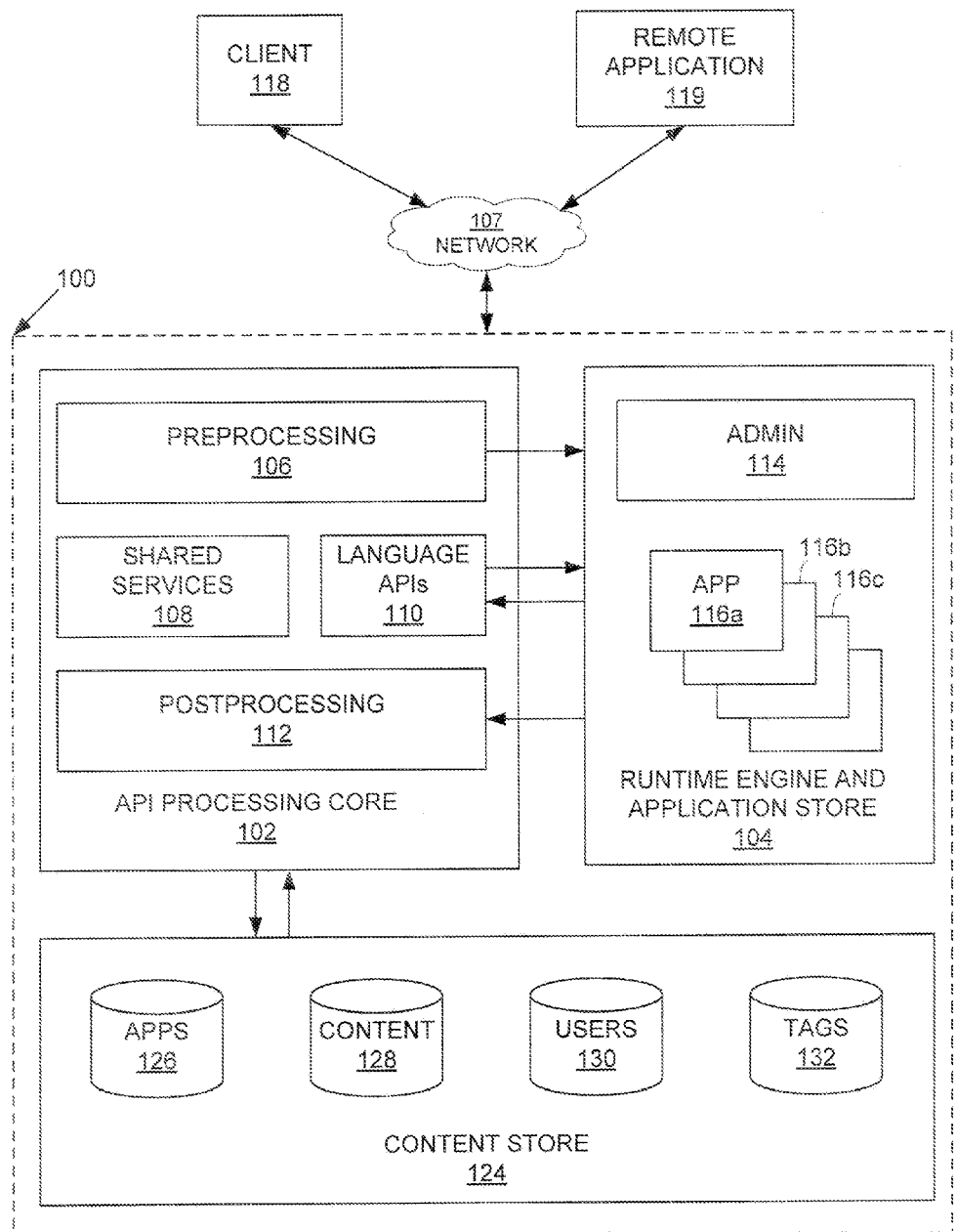
FIG. 1 illustrates an architecture for supporting web applications in accordance with an embodiment of the present invention.
Figure 2:
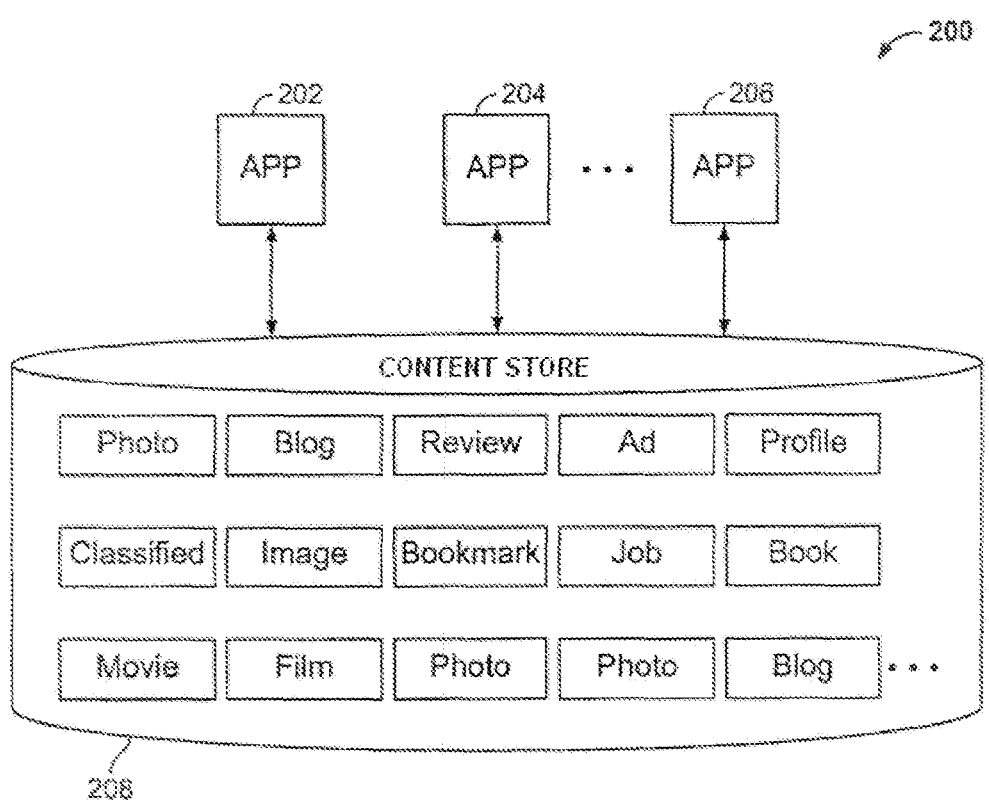
FIG. 2 illustrates a content store used by the architecture.

An exemplary system architecture is now described, wherein the applications for which their APIs can be provided are Web-based applications running on a hosted application server. FIGS. 1 and 2 and their associated text discuss the general functionality of the Web-based application (e.g. the generation of its content pages) using the exemplary architecture, and FIG. 3 and its associated text further discuss automatic API generation for a Web application operating within this exemplary architecture.

FIG. 1 shows a system architecture 100 for supporting Web applications in accordance with one embodiment of the present invention. A further description of embodiments of system architecture 100 is provided in U.S. patent application Ser. No. 11/134,250, referenced above as being incorporated herein.

The system architecture 100 is accessible by any number of clients 118 (although for clarity, only one is shown) via a network 107, such as the Internet; the system 100 may alternatively or additionally be accessible via one or more other networks or combinations of networks. For example, architecture 100 may be accessible via a local area network (LAN) (such as a network maintained and owned by a particular organization (e.g., school, company)) and/or a wireless (e.g., 801.11, Zigbee, etc.) or mobile (e.g., cellular) network. Additionally, in some cases the client making a request may be another application 116 hosted within the system 100 or by an application 119 at a remote location over the network; for this reason, the term "client 118" herein shall be used to refer to any type of application that is adapted to make a request of the system 100.

Architecture 100 includes an API processing core 102 and a runtime engine and application store 104, each of which has one or more modules. As used herein, a "module" is any program, logic, and/or functionality that is implemented in software and/or hardware. The API processing core 102 handles both requests for providing an entire Web page of content and for executing an API call, the latter typically being one step in accomplishing the former, and includes a preprocessing module 106 that analyzes requests from the client 118. A request can be initiated, for example, by a user (at client 118) entering a Web page address (i.e. a uniform resource locator (URL)) associated with a Web application 116 supported by architecture 100. A request may also be generated by the user selecting a link (via, for example, a mouse click) on a Web page that references a Web application 116 supported by architecture 100. A request may also be generated by an application (such as application 116 or 119) making a request for content held in content store 128.

The runtime engine and application store 104 are adapted to store in memory and execute Web applications 116 written in various programming languages. For example, the runtime engine and application store 104 can support web applications in any one or more of the PHP, JavaScript, Ruby, Perl, and Python programming languages. Each Web application 116 has an owner, and as such, the runtime engine and application store 104 may store Web applications for a plurality of users, each user being able to access at least his or her Web applications stored in the runtime engine and application store 104. In addition, the Web applications 116 are made available to be viewed and used by users other than their respective owners. In other words, the system 100 enables users to create and share applications 116 amongst any number of other users. This feature goes beyond existing application hosting websites or social networking websites, which provide a fixed set of one or more applications and at best allow users to create, upload and share content or data. In these existing systems, the applications provided by the site are created only by the site owner and developer; users themselves cannot create new applications to be hosted on the site and shared by others.

Generally, the applications 116 access various types of data managed by the content store 124. The content store 124 is a common structure in which data can be stored, shared, and retrieved by multiple web applications 116. In other words, the content store 124 includes a shared set of data that may be accessed and modified by multiple users or web applications 116. Objects (data) in the content store 124 are contributed by architecture 100 itself and/or by users of architecture 100. As shown in FIG. 1, the content store 124 includes one or more substores 126, 128, 130, 132. Particularly, the content store 124 includes an apps data substore 126, a content data substore 128, a users data substore 130, and a tags data substore 132. The apps data substore 126 stores metadata about applications, such as the identity of the owner; the content data substore 128 stores application "content objects" (discussed below); the users data substore 130 stores information on system users, such as username and password, as well as profile metadata; and the tags data substore 132 stores identities of the content objects, users, applications, or other objects that a user has "tagged" with a personal string, as well as the value of the tag itself. A further description of embodiments of the content store 124 is provided in U.S. patent application Ser. No. 11/195,378, referenced above as being incorporated herein.

FIG. 2 further illustrates the content store 124, which stores the shared data for each web application 116. The content store 124 includes, in addition to the apps data substore 126, users data substore 130, and tags data substore 132, a content data substore 128 containing a plurality of content objects associated with a plurality of content object types. A content object, as used herein, refers to any structure or object that represents system or user and/or developer contributed content. Content objects can have a content object type (or content type). Content types can include, for example, photo, blog, review, ad, profile, classified, image, bookmark, job, book, movie, film, restaurant, etc. More generally, each application 116 is adapted by its owner to access one or more types of objects from the content store. For example, applications 116 can be adapted to provide classified ads (for items for sale, employment, etc.), reviews or recommendations (e.g., of restaurants, books, films, etc.), image libraries, social networks, and so forth. Thus, the content store 124 can store any type of data, and can facilitate access to such data in a flat file or relational database manner. The data for any particular application is defined according to an associated schema; the schema defines the attributes for each item (equivalently, record), including attribute types, value and integrity constraints, relationships between items, and so forth.

As noted above, each application 116 has an owner, which will be one of the users; each user is registered with the system 100 and has a user record in the users data substore 130. A user may be the owner of any number of applications 116. For each application, the owner sets the access privileges that are available to others. The owner can make the application 116 available to all other users, or to any specified group or groups of users. The owner can also specify the level of access to the application's own functionality (e.g., the ability to modify the application) and the level of access to the application's data in the content substore 128 (e.g., create, read, update, delete).

Referring again to FIG. 1, in general, the preprocessing module 106 authenticates requests from the client 118. The authentication process includes authenticating a user and determining privileges associated with that user. To authenticate the user, name and password information is accessed from the user data substore 130; similarly the user's privileges with respect to the system or particular applications are accessed here, as well. The authentication process can also include adding information (e.g., tokens) to an incoming request, and/or performing one or more security measures (e.g., recording an internet protocol (IP) address of the client 118).

Upon authenticating a particular request, the preprocessing module 106 passes the request to the runtime engine and application store 104 via an appropriate language application program interface (API) 110 for the application, selecting the appropriate language API based upon the source languages of the code modules in which the Web-based application is implemented and which are implicated by the request.

In general, an incoming request to the runtime engine and application store 104 causes execution of code in the web application 116 referenced by the request. The execution may, for example, directly call up particular web services or make callbacks to API processing core 102. Callbacks to API processing core 102 request a service from a shared services module 108. In general, the shared services module 108 provides services to users for use in their web applications. More particularly, for example, the shared services module 108 provides services for messaging, user registration, tagging, searching, account management, navigation, and/or advertising. Further, the shared services module 108 can make calls to a content store 124 to access any data of the substores therein. As instances of execution are completed in the runtime engine and application store 104, the runtime engine and application store 104 outputs the results of each call to a post-processing module 112 in API processing core 102. The post-processing module 112 takes the output from the runtime engine and application store 104 and builds a web page (or other form of result) that can be delivered to and displayed at the client 118.

It is within the context of such a system that the automatic API generation of the present invention operates.

Providing an Application API

Web-based applications require an application-layer network communication API to transmit a call across the network from the client to the Web-based application. There exist various design methodologies for network communication APIs, including remote procedure call (e.g. XML-RPC), service-oriented architectures (e.g. SOAP), and representational state transfer ("REST"). The present invention is not limited to a particular one of these methodologies for performing application-level network communications. Rather, the particular methodology is a design choice left to the system designer.

In one embodiment, the REST methodology is employed to implement the network communications API. A REST-based communication system transmits domain-specific data over an application independent protocol, such as the HTTP application-layer protocol, without employing an additional messaging layer, such as SOAP. Further, the application data and operations desired to be exposed as application services are described as resources identified by a universal syntax, such as a uniform resource locator (URL), and are manipulated solely using standard verbs/commands within the application-layer protocol, such as HTTP command verbs "GET," "PUT," "POST," and "DELETE." As a result, application developers do not need to impose any further application-specific processing overhead on the clients, such as constructing SOAP-compliant messages, or marshalling data for RPC type commands.

Figure 3:
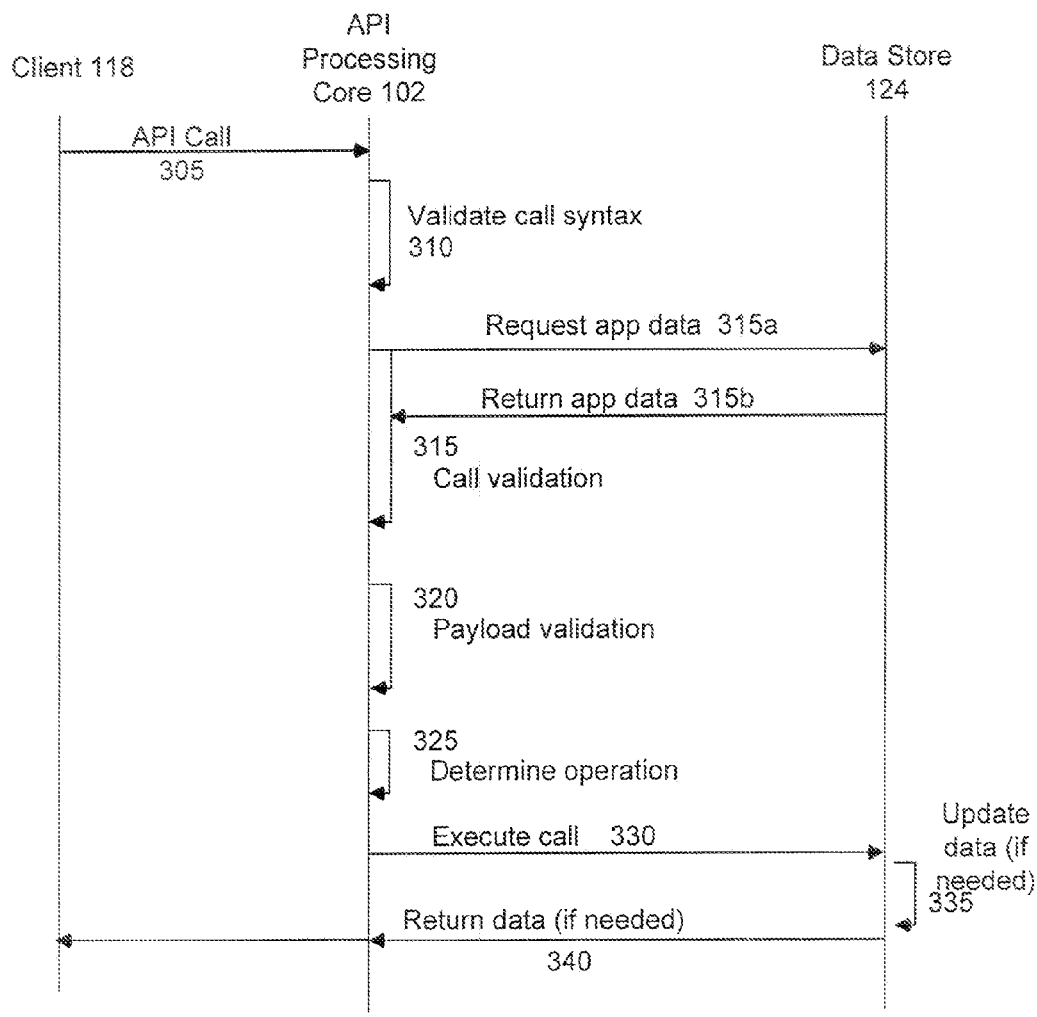
FIG. 3 is an event trace of steps involved in analyzing and executing an API call.

FIG. 3 illustrates the process flow for providing an application API. The method begins at the initiative of the client 118, which is typically a separate application but could also be a human user accessing the system via a suitable interface application, such as a Web browser.

The client issues 305 a call to the Web-based application, the call being received by API processing core 102. The call is in the form of an HTTP request, with the syntax of the call constructed with a restricted set of application independent operators and parameters that can be applied to any of the applications 116 (i.e., the operators and parameters are not defined by the applications), as well as whatever application specific resources or data are to be handled for the request. The API processing core 102 then performs a number of steps 310-330 to analyze and execute the call, including validating the call syntax, checking the call operation, and executing the call against the content store 124. These steps are further described below with reference to the above embodiment of hosted Web-based applications, where the network communication API is designed according to the REST methodology. One of skill in the art would realize, however, that the application is not limited to these particular embodiments. For example, the Web-based applications need not all be within the same system, nor need they structure their services or data storage in the manner disclosed, nor need the REST methodology be employed for network communications.

The API processing core 102 validates 310 that the URL has proper syntax. The syntax for the call identifies the application for which the call is being made, the data protocol for the result to be returned, and the operation, defined by operators and parameters, to be executed on the application and its associated data. As noted above, apart from the data described in the call, all other syntax elements are application-agnostic, and hence available for all applications. This is one feature that frees the application developers (e.g., the owners) from having to write their own APIs for their applications.

In one embodiment, the syntax of the URL is of the form <application>/<data protocol>/<endpoint>. In the sample URL restaurant.host.com/xn/atom/1.0/content (author='steve')", "restaurant.host.com" is the application pathname component that identifies the application, "xn/atom/1.0" is the data protocol pathname component that describes the language format for the result, and "content (author='steve')" is an example endpoint pathname component that defines the operation to be executed. Within the operation, "content" describes the operation type, and "author='steve'" is a parameter, here called a selector. Selectors are parenthesized portions of the endpoint that serve as filters that control what information is returned from the endpoint. They consist of arbitrary boolean expressions that involve field, selector operator, and value, and that can be nested using parentheses. The endpoint can include multiple operators and selectors.

More specifically, the application pathname component specifies the name of the particular application to be called. For example, the name "restaurant.host.com" specifies the application named "restaurant" that is hosted in the domain "host.com." Additionally, a particular reserved name, such as "api.host.com", may be used to specify that a call is to be issued to the API processing core 102 itself, which supports actions that can be applied against any or all of the applications 116, such as accessing metadata about any of the applications 116. In such a case, the Web-based application may itself be a composite of all the hosted Web-based applications 116, so that the application data includes the union of data and metadata for the set of all applications.

The data protocol pathname component specifies the data format provided in the request and expected for the response. For example, "xn/atom/1.0" specifies that data returned by the call should be in version 1.0 of the Atom XML data protocol. Of course, data protocols other than Atom may be used.

Finally, the endpoint's types specify the type of API call desired, and the endpoint's selectors, if any, specify the particular attributes of the call. For example, for endpoint "content(author='steve')", the operation type "content" specifies that the application should return its own content data objects, and the selector "author='steve'" specifies that, more particularly, the application data objects returned should be those created by the application user "steve." The endpoint types preferably are taken from a fixed set of endpoints defined by the system designer, and applicable across all applications 116. In one embodiment, the set of endpoints is "content," "application," "profile," and "tag," allowing access to content objects, application metadata, user profiles, and user-tagged objects, respectively, stored in the various substores of the content store 124. The various attributes specified by the selectors may be either general or application-specific. For example, the compound selector "author='steve'&my.avgRating>4" includes both a general attribute applicable to all applications (i.e. the author of the application) and an application-specific attribute (i.e. the my.avgRating data).

The following tables further describe the details of the API syntax for one embodiment of the system 100.

Table 1 lists the various endpoints of an exemplary embodiment.

TABLE 1

| Resource | Action type | Request Body | Command | Endpoint | Description |
|---|---|---|---|---|---|
| Content | Create | <entry/> | POST | /content | |
| Content | Update | <entry/> | PUT | /content(C) | Content which matches the selector C is replaced with the new representation. |
| Content | Delete | — | DELETE | /content(C) | Content which matches the selector C is deleted. |
| Content | Query | — | GET | /content(C) | Returns a feed of content entries. |
| Content | Rollup Query | — | GET | /content(C)/rollup(R) | Returns a feed of <xn:rollup/>s containing the content selected by C rolled-up as described by R |
| Application | Query | — | GET | /application | Returns a feed containing an entry describing the current application. |
| Application | Query | — | GET | /application/children | Returns a feed containing entries describing the current application's children. |
| Application | Query | — | GET | /application/parent | Returns a feed containing an entry describing the current application's parent. |
| Profile | Query | — | GET | /profile(P) | Returns a feed of profiles matching selector P |
| Tag | Create | <entry><xn:tag/>+</entry> | POST | /content(C)/tag | Applies the provided tags to the content matching selector C. |
| Tag | Delete | — | DELETE | /content(C)/tag(T) | Deletes the tags which match selector T from the content which matches the selector C |
| Tag | Query | — | GET | /content(C)/tag | Returns a feed of tags for content matching selector C |
| Tag | Rollup Query | — | GET | /tag(T)/rollup(R) | Returns a feed of <xn:rollup/>s containing the tags selected by T rolled-up as described by R |
| Tag | Query | — | GET | /tag(T)/content | Returns a feed of content tagged with tags matching selector T. |
| Tag | Rollup query | — | GET | /content/tag/rollup | Returns a feed of <xn:rollup /> elements describing tags against all content in the app rolled up by frequency. |
| Role | Create | <xn:role/> | POST | /role | Adds the specified role to applications matching selector A |
| Role | Create | <xn:role/> | POST | /profile(P)/role | Adds the specified role to profiles matching selector P in applications matching selector A |
| Role | Delete | — | DELETE | /role(R) | Deletes the roles matching selector R from applications matching selector A |
| Role | Delete | — | DELETE | /profile(P)/role(R) | Deletes the roles matching selector R from profiles matching selector P in |

TABLE 1-continued

| Resource | Action type | Request Body | Command | Endpoint | Description |
|---|---|---|---|---|---|
| | | | | | applications matching selector A. |
| Role | Query | — | GET | /role | Returns a feed of <xn:role/>s in applications matching selector A. |
| Role | Query | — | GET | /role(R)/profile | Returns a feed of profile entries that have role R in applications matching selector A |
| Role | Query | — | GET | /profile(P)/role | Returns a feed of <xn:role/>s for profile P in applications matching selector A |

Note that the selector parameters, such as C, P, R, and T in the endpoints of Table 1, may specify application-specific values, effectively creating an application-specific call out of what is otherwise an application-neutral "meta-API."

Table 2 lists the selector operators that are used within the [field, selector operator, value] triplets used in selectors, according to the preceding exemplary embodiment.

TABLE 2

| Selector Operators | |
|---|---|
| Operator | Meaning |
| = | equal to |
| <> | Not equal to |
| Eic | equal to, ignoring case |
| Neic | Not equal to, ignoring case |
| > | greater than |
| < | Less than |
| >= | greater than or equal to |
| <= | Less than or equal to |
| Like | Full-text search |
| Likeic | Full-text search, ignoring case |
| In | in a list of values |

Note that not all fields can be used with all selector operators, and not all fields and selector operators can be used in all selectors. Tables 3 through 7 list which fields and selector operators are available in the different kinds of selectors, according to the exemplary embodiment.

TABLE 3

| Profile Selectors | | |
|---|---|---|
| Field | Operator(s) | Value(s) |
| Id | = | Screen name of profile to retrieve |

TABLE 4

| Role Selectors | | |
|---|---|---|
| Field | Operator(s) | Value(s) |
| Id | = | name of role to retrieve |

TABLE 5

| Content Rollup Selectors | | |
|---|---|---|
| Field | Operator(s) | Value(s) |
| Field | = | type to rollup by content type |
| Field | = | Author to rollup by content author |

TABLE 6

| Content Selectors | | |
|---|---|---|
| Field | Operator(s) | Value(s) |
| Id | in, =, != | Content object ID. The in operator expects a list of IDs. |
| published | =, !=, <, >, <=, >= | Appropriately-formatted time/date string. |
| updated | =, !=, <, >, <=, >= | Appropriately-formatted time/date string. |
| Type | =, !=, eic, neic | String |
| Title | =, !=, like, likeic | String. With = or != and a null value, it matches content with (or without) a null title. |
| summary | Same as title | Same as title |
| my.developerAttribute | Same as title | developerAttribute is the name of any developerAttribute, otherwise same as title |

TABLE 7

| Tag Selectors | | |
|---|---|---|
| Field | Operator(s) | Value(s) |
| Value | = | String: tag value |
| Author | = | String: tag creator screen name |
| createdDate | =, !=, <, >, <=, >= | Appropriately-formatted time/date string. |

The selector values may be of various types, such as strings, numbers, or dates. Table 8 sets forth a description of how a set of supported types is specified, according to the exemplary embodiment discussed above.

TABLE 8

Selector Value Formatting

| Type | Value Format |
|---|---|
| NUMBER | double-precision IEEE 754 floating point number, e.g. 42 or −137.14 |
| STRING | '-delimited string with internal' and \ characters escaped with \ |
| DATE | A complete ISO-8601-encoded date, plus hours, minutes, seconds, and timezone specifier |
| BOOLEAN | true or false |
| NULL | Null |
| LIST | "[", followed by one or more comma-delimited NUMBERs, STRINGs, DATEs, BOOLEANs, or NULLs, followed by "]" |

The combination of the application, data protocol, and endpoint components, as well as application-neutral values of the selector component, can be seen as constituting a meta-API applicable to all applications running on the hosted Web server. The addition of selectors that reference application-specific attributes results in an API specific to a particular application. As a result, owners of the applications need not write any specific APIs for their applications at all. Rather, they need only define the data which the application uses and any internal functionality that operates within the application itself. Note that the applicability of the meta-API to each hosted application makes for much more efficient API call processing than if each application had an API with an entirely distinct format, since this allows the API processing core 102 to execute much optimized, general-purpose code before being required to examine application-specific details.

Referring again to FIG. 3, the API processing core 102 performs various availability and security validation actions 315 on the call in order to ensure that it is both possible and safe to execute the call. One action is to verify that the specified application does in fact exist and is available. This is done by querying 315a-315b the data store 124 for the application identifier. If the data store 124 validates the existence of the application, the core 102 continues processing.

Another action is to ensure that the client 118 has permission to perform the action specified by the endpoint, i.e. the call does not violate application security settings. This may be accomplished by querying 315a-315b the data store 124 for the owner of the application and comparing the current user against the owner's security constraints. For example, one simple security scheme is to allow the call if the current user is the owner, but if the current user is not the owner, to allow the call only if the current user is on the owner's list of authorized users. A more complex security scheme also takes into account the level of privacy of the data and whether the request involves reading or writing data. For example, data designated private is not be accessible by any user other than the owner, and a read of non-private data is allowed to any user, but a data write is allowed only for the author and his or her authorized users. Alternately, in another exemplary security scheme, operations that create, update, or delete data may be performed only by the owner of the application. In such a scheme, the operation may be performed over the Secure Sockets Layer (SSL) protocol (specified by the URL beginning with "https://" rather than "http://"), with the authentication credentials being sent according to the HTTP Basic Authentication standard.

Yet another action is to verify that the actual data read and/or written has a format matching that specified in the call. Since the format of an application's data can be changed over time, it is important that the automatically-provided API accounts for these changes. Thus, if a particular data field in the data for an application has 2 elements (e.g., a user has "first name" and "last name"), the API processing core 102 will accept calls specifying 2 elements, but not those specifying 3, unless, of course, in a particular context it is desirable to allow implicit creation of new data. In the latter case, the API processing core 102 can modify the schema for the data, and update it to include the additional data elements. Then, after the data field has been set to have 3 elements, however, the API processing core 102 will automatically accept calls specifying 3 elements. This automatic adjustment of the API can be accomplished by dynamic checking of the current data store schema for the relevant data.

The API processing core 102 checks 320 that the payload of the HTTP request, if any, is well-formed and valid according to the data protocol specified by the data protocol component of the URL. For example, if the data protocol component is "xn/atom/1.0", the API processing core 102 verifies that the payload conforms to the general XML syntax and more specifically to the semantics of version 1.0 of the Atom XML data protocol. Note that this verification is skipped when the HTTP request corresponding to the URL of the received call has no payload, as is usually the case for operations resulting in data reads, but no data writes.

If all the validation checks of steps 310-320 above result in positive outcomes, then the API processing core 102 determines that the call is a valid call within the API of the Web-based application to which the call is directed and proceeds to execute the call, as described below. If any of the checks fail, however, the API processing core 102 rejects the call, invokes its own error handling routines and returns an error code and optionally an explanation, and terminates processing rather than proceeding to the following steps.

The API processing core 102 determines 325 which HTTP I/O command (e.g. GET, POST, PUT, DELETE) to use to carry out the request by examining the request line of the HTTP request message. Once the appropriate command has been determined, the API processing core 102 then runs it against the content objects and metadata for the specified application, supplying any needed parameters from the call request payload.

After determining 310-320 that the call is a valid call to the API of the specified application and having determined 325 what HTTP I/O command to use to carry it out, the API processing core 102 executes 335 the call, performing the action specified by the endpoint URL component against the data store's 124 content objects and metadata for the specified application.

If the call is one resulting in creation or modification of data of the content store 124, such as a call entailing a PUT command, then at step 335 the content store 124 responds to the issued call by modifying the data accordingly. For example, if the call specifies a DELETE command for the URL restaurant.host.com/xn/atom/1.0/content (author='steve'), then the content store 124 will delete all content objects with author 'steve'.

It is expected that most calls will involve textual data. Creation of binary data may be accomplished in much the same was as textual data, however, the difference lying in the request headers, request payload, and the URL query parameters, rather than in the main body of the URL itself. For example, posting a block of text and a binary image object to a given application, would involve the same URL body, e.g. restaurant.host.com/xn/atom/1.0/content. However, creating the block of text would involve the HTTP request payload containing an XML document, such as one following the Atom data protocol, and the binary image object would involve a payload containing the raw binary data. Additionally, creating the binary image object would involve providing a suitable MIME type for the HTTP Content-Type header (e.g. image/png), and placing a "binary=true" parameter in the URL query string.

If the call is one resulting in retrieval of data from the content store 124, such a call entailing a GET command, then the content store 124 responds to the issued call by returning 340 the requested data. For example, if the call specifies a GET command for the URL restaurant.host.com/xn/atom/1.0/content(author='steve'), then the content store 124 will retrieve all content objects with author 'steve' and return them to the API processing core 102, which will in turn communicate the retrieved content objects to the client 118.

Finally, as described above in conjunction with FIG. 1, the post-processing module 112 can then use the current state of the content store 124 and/or application store 104 to generate a web page (or other form of result) to be delivered and displayed at the client 118.

Thus, by providing a flexible meta-API applicable to a each of a set of Web applications, with at most only a small number of well-defined points required for specifying application-specific details, and by providing runtime system checks to ensure that the application-specific portion of the call properly accesses operations currently exposed by the application, the application developer is freed from the necessity of providing his or her own API. Rather, a client can easily specify a call using the basic meta-API (with application-specific details specified as needed), and the system can properly interpret, verify, and execute the call, leaving the developer free to concentrate on tasks more creative and productive than routine API specification and maintenance.

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A system for automatically providing an API to a Web-based application, comprising:
   a data store, further comprising:
      a content store configured to store data shared among a plurality of Web-based applications, and
      an application store configured to store data specific to the Web-based application; and
   an API processing core configured to:
      receive a call to a Web-based application via a network communication protocol from a client, the call including an application identifier and an endpoint, and entailing at least one of an input and an output operation against the data store;
      determine whether the call is a valid API call to the Web-based application based upon the application identifier and the endpoint of the call, and upon a portion of the data store corresponding to the Web-based application; and
      responsive to the call being a valid API call, execute the call against the Web-based application's data in the data store.

2. The system of claim 1, wherein the network communication protocol is HTTP.

3. The system of claim 2, wherein input and output methods to be performed on the data store are accomplished using only HTTP command verbs.

4. The system of claim 1, wherein the network communication protocol is XML-RPC.

5. The system of claim 1, wherein executing the call against the Web-based application's data in the data store comprises:
   checking call syntax;
   performing validation actions on the call;
   performing the call against the data store; and
   responsive to the call specifying a data read, returning a relevant subset of the data in the data store to the client.

6. The system of claim 5, wherein the call comprises a URL that specifies an application resource to be accessed.

7. The system of claim 6, wherein returning a relevant subset of the data in the data store comprises returning data according to the data protocol specified in the URL.

8. The system of claim 5, wherein checking call syntax comprises ensuring that the call specifies an application identifier, data protocol, and endpoint, where the data protocol specifies the format of the desired data, and the endpoint specifies the operation to be performed.

9. The system of claim 8, wherein the application identifier is a domain name.

10. The system of claim 8, wherein the data protocol is the Atom XML data protocol.

11. The system of claim 5, wherein checking call syntax comprises verifying that a payload of the call is a well-formed and valid XML document.

12. The system of claim 5, wherein performing validation actions on the call further comprises:
   verifying that the Web-based application exists;
   verifying that the Web-based application is available; and
   verifying that the client has permission to perform the operation specified by the endpoint.

13. A method for automatically providing an API to a Web-based application, comprising:
   providing a data store, comprising:
      a content store configured to store data shared among a plurality of Web-based applications, and
      an application store configured to store data specific to the Web-based application;
   receiving a call to a Web-based application via a network communication protocol, the call including an application identifier and at least one endpoint and entailing at least one of an input and an output operation against the data store;
   determining whether the call is a valid API call to the Web-based application based upon the application identifier and the endpoint of the call and a portion of the data store corresponding to the Web-based application; and
   responsive to the call being a valid API call, executing the call against the Web-based application's data in the data store.

14. The method of claim 13, wherein input and output operations to be performed against the data store are accomplished using HTTP command verbs.

15. The method of claim 13, wherein executing the call against the Web-based application's data in the data store comprises:
   checking call syntax;
   performing validation actions on the call;
   performing the call against the data store; and
   responsive to the call specifying a data read, returning a relevant subset of the data in the data store to the client.

16. The method of claim 15, wherein the call comprises a URL that specifies an application resource to be accessed.

17. The method of claim 15, wherein checking call syntax comprises ensuring that the call specifies an application identifier, data protocol, and endpoint, where the data protocol specifies the format of the desired data, and the endpoint specifies the operation to be performed.

18. The method of claim 17, wherein the application identifier is a domain name.

19. The method of claim 15, wherein performing validation actions on the call further comprises:
   verifying that the Web-based application exists;
   verifying that the Web-based application is available; and
   verifying that the client has permission to perform the operation specified by the endpoint.

20. A method for automatically providing an API to a Web-based application, comprising:
   providing a data store, comprising:
      a content store configured to store data shared among a plurality of Web-based applications, and
      an application store configured to store data specific to the Web-based application;
   receiving a call to a Web-based application via HTTP, the call comprising a URL including an application identifier and at least one endpoint, where the URL has the form <application identifier>/<data protocol>/<endpoint>, <application identifier> being a domain name corresponding to the Web-based application, <data protocol> specifying the format of the desired data, and <endpoint> specifying the operation to be performed, and where the call entails at least one of an input and an output operation against the data store;
   determining whether the call is a valid API call based upon the application identifier and the endpoint of the call and a portion of the data store corresponding to the Web-based application; and
   responsive to the call being a valid API call, executing the call against the Web-based application's data in the data store, the execution comprising:
      checking call syntax, comprising verifying that a payload of the call is a well-formed and valid XML document,
      performing validation actions on the call, including application availability and client permissions,
      performing the call against the data store using the determined operation, and
      responsive to the call specifying a data read, returning a relevant subset of the data in the data store to the client according to the data protocol specified in the URL.

* * * * *